United States Patent [19]
Constantinescu et al.

[11] 3,735,826
[45] May 29, 1973

[54] SEALED BEARING WITH HYDROSTATIC PRESSURE BALANCING FOR CORE BARRELS

[75] Inventors: Dorin Constantinescu; Sever Cruceanu; Eugen Spataru; Nicolae Mereanu, all of Bucharest, Romania

[73] Assignee: IPCUP Institutul De Proiectari Si Cercetari Pentru Utilaj Petrolier, Bucharest, Romania

[22] Filed: June 17, 1971

[21] Appl. No.: 154,145

[52] U.S. Cl. ................. 175/228, 175/239, 175/252
[51] Int. Cl. ............................................. E21b 9/20
[58] Field of Search .................... 175/227, 228, 236, 175/239, 244, 246, 249, 252

[56] References Cited

UNITED STATES PATENTS

| | | | |
|---|---|---|---|
| 3,241,623 | 3/1966 | Martinez | 175/239 X |
| 3,487,890 | 1/1970 | Martinsen | 175/228 X |
| 2,555,580 | 6/1951 | Deely | 175/228 |
| 2,587,231 | 2/1952 | Schierding | 175/227 |
| 2,621,897 | 12/1952 | Brown | 175/246 X |
| 3,363,703 | 1/1968 | Shewmake | 175/252 X |

*Primary Examiner*—David H. Brown
*Attorney*—Karl F. Ross

[57] ABSTRACT

A coring device has an elongated tubular drill receiving a tubular core barrel which is mounted on the drill by a bearing and defines with the drill a drilling-fluid passage. The bearing is enclosed in a fluidtight lubrication compartment that must be protected from the drilling fluid. To this end one axial wall of the compartment is formed as a piston which can be displaced axially by a pressure differential between the lubrication compartment and the drilling-fluid passage to hydrostatically equalize the two pressures and prevent cross leakage.

8 Claims, 1 Drawing Figure

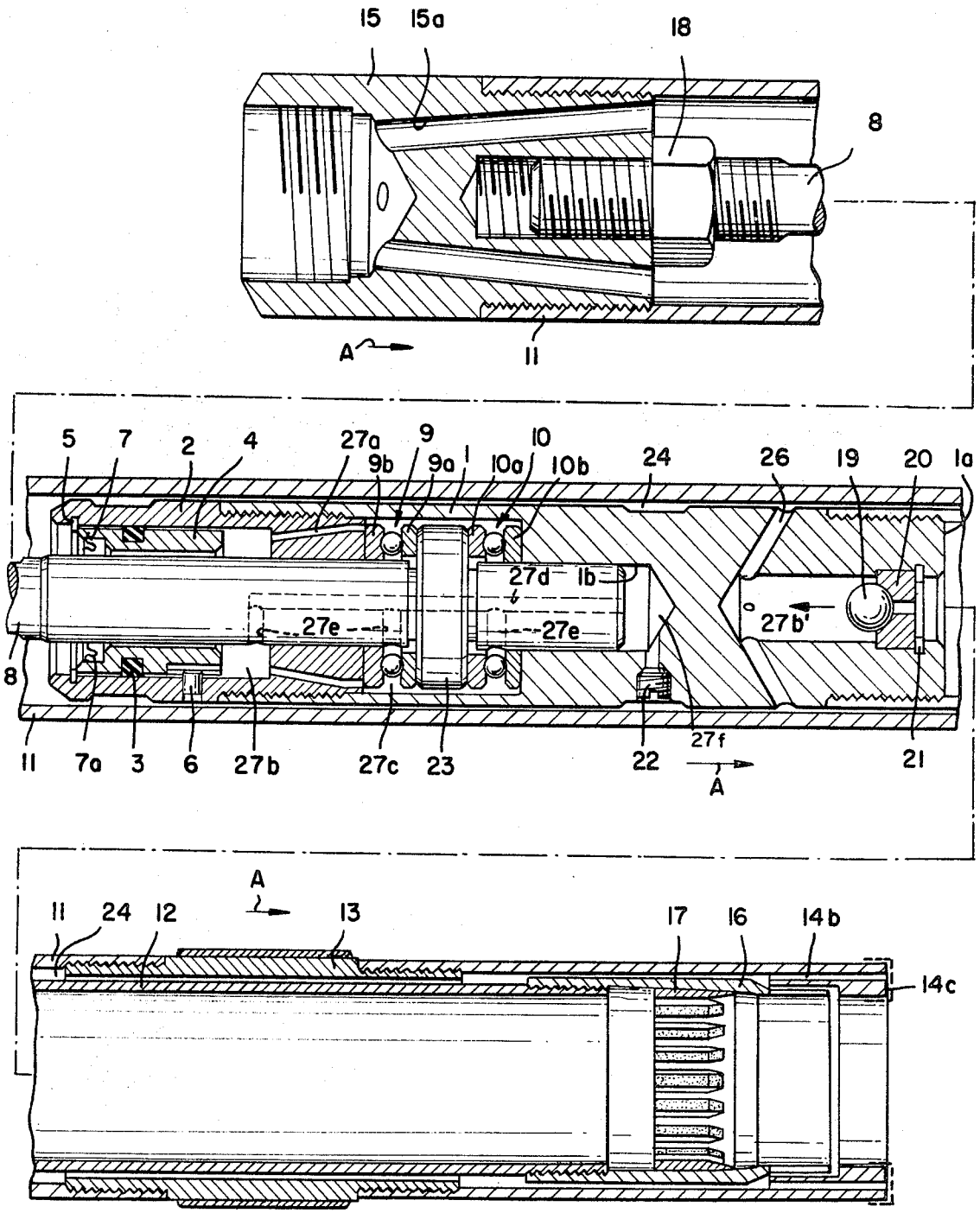

SEALED BEARING WITH HYDROSTATIC PRESSURE BALANCING FOR CORE BARRELS

FIELD OF THE INVENTION

The present invention relates to a coring apparatus. More particularly, this invention concerns such an apparatus wherein a hollow drill receives a relatively rotatable core barrel.

BACKGROUND OF THE INVENTION

A coring device is used to sample rock for any of a multitude of purposes, such as in exploring for oil or testing for foundations. The drill, which is an upright tube having a bit at its lower end, cuts an annular cylindrical hole with the core rising in the core barrel, which is another tube extending coaxially through the drill. Drilling fluid serving to cool the bit and carry off the chips is pumped down through the annular elongated passage between the two tubes, and rises up around the outside of the drill. The drill is connected to the upper end of the core barrel by means of a bearing usually of the roller or ball type.

This bearing clearly must be lubricated with oil or grease. Its exposure, therefore, to the drilling fluid (which is often drilling mud and water) creates a great hazard. Should any of this mud get into the bearing it will quickly ruin it and thereby cause the drill and barrel to rotate together, thereby fragmenting and ruining the core as well as destroying a costly piece of equipment.

It has been the general practice simply to form a lubrication compartment around the bearing which is very tightly sealed so that entry of drilling fluid is not possible. If the seal is too tight, it rotationally links the core barrel and drill or else is prone to break down and thereby defeats the whole purpose of the bearing. If it is too loose, however, the constant pressure fluctuations in the drilling mud will pump some mud across the seal into the lubrication compartment and thereby contaminate the lubricant.

OBJECTS OF THE INVENTION

It is therefore an object of the present invention to provide an improved coring device.

Another object is the provision of a coring apparatus whose bearing between the core barrel and drill is protected from contamination by the drilling fluid.

Yet another object is to provide a seal which protects such a bearing in a simple and efficient manner while reducing rotational entrainment of the core barrel by the drill to a minimum.

SUMMARY OF THE INVENTION

The above objects are attained, according to the present invention, in a coring device wherein the compartment containing the bearing is provided with a movable partition or wall separating it from the drilling-fluid passage so that, with pressure fluctuations, this wall moves and hydrostatically balances and equalizes pressure between the compartment and passage, making leakage virtually impossible.

According to other features of this invention, this partition is an axially slidable annular piston surrounding a stem which extends axially from the drill and which carries the bearing. The compartment is annular in part, surrounding the stem below the piston, and communicates through bores with the region surrounding the bearing. This piston is sealed by means of a resilient but highly flexible cuff against the stem and by means of a conventional seal ring with the inner wall of the compartment, with a pin being provided in the barrel holder to fix the piston rotationally to this holder.

The bearing, according to another feature of the present invention, is a pair of roller bearings axially flanking a radially projecting collar of the stem and each having one race on the collar and another race fixed to the barrel holder in order to take up thrust. There is little possibility of canting of the barrel in the drill since the two are both quite long and nested, and the drilling fluid fills the annular gap between them.

DESCRIPTION OF THE DRAWING

The above and other objects, features and advantages will become apparent from the following description, reference being made to the drawing whose sole FIGURE is a longitudinal section through a coring device according to the present invention.

SPECIFIC DESCRIPTION

The coring device includes an outer tubular drill 11 threaded at one end onto and end piece 15 adapted to be screwed onto the drill stem. At its other end, the drill tube 11 is threaded onto a calibrating adaptor 13 onto which is threaded the bit 14 which is formed with a circular flat face 14a on which axially extending bores 14b open.

Within the drill tube 11 is a core barrel 12 threaded at one end into a case 16 for core retainers 17 and at the other end over one end of a core-barrel holder formed by a pair of threadedly interengaged elements 1 and 2. A spindle 18 is threaded at one end into the piece 15 with a lock nut 18 holding it in place. This spindle 8 determines the axial positioning of the open end of the core barrel 12 relative to the bit 14 depending on how far into the endpiece 15 it is screwed. A radially projecting abutment collar 23 integral with the spindle 8 is engaged by a pair of races 9a and 10a of respective thrust ball bearings 9 and 10 whose other races 9b and 10b, respectively, bear against the parts 2 and 1 of the core-barrel holder.

Such a coring device is pushed in the direction shown by arrows A down into the ground. The bit 14 cuts a circular and annular hole in the rock as drilling fluid is pumped through bores 15a in the socket piece 15 whence it flows through the annular space 25 surrounding the central region of the spindle 8 and then down through the cylindrically annular passage 24 between the tubes 11 and 12 and out at the bit face 14a from bores 14b. This drilling mud carries off the chips and cools the bit, with the chips and mud thereafter rising against direction A around the device in the bore. As the drill cuts its annular hole, the core rises in the barrel 12 which does not rotate so that the core is not broken up. Any drilling fluid captured in the barrel 12 by the pistonlike core is forced through conduit in which is provided a check valve formed by a ball 19 resting on a rubber seat 20 held in place by a snap ring 21 and out through a plurality of downwardly inclined bores 26 into the passage 24. When the top of the core comes into engagement against the face 1a of the holder 1, 2 the drill will obviously no longer sink, thereby signaling for withdrawal and removal of the core specimen.

The bearings 9 and 10 are lubricated with heavyweight oil or grease. To this end a compartment 27a–f is formed between the two holder sections 1 and 2. The compartment 27a–f comprises a plurality of generally axially extending bores 27a interconnecting an annular chamber 27b surrounding the stem 8 with a chamber 27c containing the bearings 9 and 10 and the collar 23. In addition, a bore 27d extending axially through the end region of the spindle 8 has laterally opening branches 27e one of which opens into the chamber 27b and two of which open into the chamber 27c at the inside of the bearings 9 and 10. The very end of the spindle 8 is journaled in an axially extending bore 1b formed in the element 1 and defines a small chamber 27f into which opens the bore 27d. A lateral plug 22 on the element 1 can be unthreaded to allow grease to be injected into this chamber 27f.

One wall of the compartment 27b is formed by an axially displaceable cylindrically annular piston 4 slidably received in the element 2 and rotatably fixed by a pin 6 in the element 2 engaging in an axial groove in this piston 4. At its end toward the end piece 15 the piston 4 is provided with a cuff 7 which has an outer periphery received in an annular groove 7a and which has an inner periphery that grips the spindle 8. A snap ring 5 fitted into the element 2 limits travel of the piston 4 toward the end piece 15 and a seal ring 3 prevents leakage around the piston 4. The cuff 7 thus has a lip bearing with light pressure against the lip of the piston defined by stepping the internal bore of the latter.

As the coring device is used, the pressure of the drilling fluid in the passage 24, 25 will inevitably fluctuate. In order to prevent the pressure differential between the passage 24, 25 and the chamber 27a–f from forcing some of the drilling mud into the compartment 27a–f, the piston 4 will displace itself toward the region of lower pressure, thereby equalizing pressures and making leakage highly improbable, if not impossible. Since a certain amount of thermal expansion of the lubricant in chamber 27a–f is inevitable, some leakage will occur outwardly, and the piston 4 will compensate for the reduced volume of lubricant by moving inwardly. Periodically, for instance, each time the barrel 12 is unscrewed from its holder 1, 2 the cap 23 is removed and the compartment 27a–f is filled up again, driving the piston 4 against its stop 5. In this manner, drilling mud is not able to get into the bearings 9 and 10, thereby giving the core drill, according to this invention, a very long service life.

We claim:

1. A coring device comprising:
   a rotatable hollow drill carrying on one end a bit;
   a core barrel received in said bit and forming therewith an annular drilling-fluid passage;
   a bearing between said barrel and said drill, said barrel being rotatable on said bearing relative to said drill and bit;
   means forming a fluidtight lubrication compartment around said bearing; and
   a partition forming a wall of said compartment between said compartment and said passage and displaceable to vary the volume of said compartment for equalizing fluid pressure between said compartment and said passage, said partition being formed by a slidable piston, said drill having an axial spindle carrying said bearing, said piston being annular and surrounding said spindle.

2. The device defined in claim 1 wherein said barrel includes a barrel holder connected via said bearing to said spindle, said holder being formed with an escape conduit extending between the interior of said barrel and said passage for releasing fluid caught by said core in said barrel.

3. The device defined in claim 1 wherein said drill has at its other end an end piece, said spindle being threadedly engaged in said end piece.

4. The apparatus defined in claim 1 wherein said barrel has a barrel holder connected via said bearing to said spindle, said spindle being formed with a radially projecting collar, said bearing including a pair of thrust bearings axially flanking said collar, said drill including at its other end an end piece adapted to be connected to a drill stem and formed with at least one generally axially throughgoing bore constituting part of said passage, said barrel holder being formed with a throughgoing conduit interconnecting its interior with said passage and being provided with a check valve in said conduit permitting fluid flow only from said interior to said passage, said barrel holder being formed with an axially extending blind bore receiving one end of said spindle, the other end of said spindle being threadedly received in said end piece, said barrel holder further being formed with a radially directed closable opening, said spindle being formed with an axial bore opening at one end in said blind bore adjacent said opening and at its other end into said compartment.

5. The device defined in claim 1, further comprising a sealing cuff having an outer periphery engaging said piston and an inner periphery engaging said shaft, and means for rotationally linking said piston to said barrel.

6. The device defined in claim 5 wherein the linking means is a radial pin fixed in said barrel.

7. The device defined in claim 1 wherein said spindle has a radially projecting collar, said bearing including a pair of thrust bearings flanking said collar.

8. The device defined in claim 7 wherein said barrel includes a barrel holder, said piston defining with said holder an annular chamber constituting part of said compartment, said means forming said compartment including a bore interconnecting said chamber and the rest of said compartment.

* * * * *